(12) United States Patent
Hernandez

(10) Patent No.: US 12,715,367 B2
(45) Date of Patent: Aug. 25, 2026

(54) QUICK RELEASE TENT MOUNT

(71) Applicant: Wheel Pros, LLC, Greenwood Village, CO (US)

(72) Inventor: Kris Hernandez, Chula Vista, CA (US)

(73) Assignee: Wheel Pros, LLC, Greenwood Village, CO (US)

( * ) Notice: Subject to any disclaimer, the term of this patent is extended or adjusted under 35 U.S.C. 154(b) by 84 days.

(21) Appl. No.: 18/823,367

(22) Filed: Sep. 3, 2024

(65) Prior Publication Data

US 2025/0074318 A1 Mar. 6, 2025

Related U.S. Application Data

(60) Provisional application No. 63/536,461, filed on Sep. 4, 2023.

(51) Int. Cl.
*B60R 9/048* (2006.01)
*B60R 11/00* (2006.01)

(52) U.S. Cl.
CPC ....... *B60R 9/048* (2013.01); *B60R 2011/0078* (2013.01)

(58) Field of Classification Search
CPC .. B60R 9/048; B60R 2011/0078; B60R 9/055
USPC ............. 224/42.4, 319, 42.32, 547; 248/503, 248/220.21, 224.8, 225.11, 675, 201, 248/222.11, 222.51, 223.31, 225.21
See application file for complete search history.

(56) References Cited

U.S. PATENT DOCUMENTS 4,274,568 A * 6/1981 Bott ........................ B60R 9/055 410/105
4,726,597 A * 2/1988 Hickin ................... A63B 55/60 280/DIG. 6
5,732,867 A * 3/1998 Perkins ..................... A45F 3/08 224/628
7,258,260 B2 * 8/2007 Hurd ....................... B60R 9/055 224/325
7,344,116 B2 * 3/2008 Ficarra .................... B63C 11/02 215/388
7,806,308 B2 * 10/2010 Gunn ........................ B60R 9/06 248/222.51
8,381,955 B2 * 2/2013 Grater ................. F01N 13/1822 224/555
9,695,973 B2 * 7/2017 Stout .................... F16M 13/022
9,956,920 B2 * 5/2018 Maguire ................ B60R 9/045
10,450,025 B2 * 10/2019 Lindén ....................... B62J 7/08
11,572,121 B2 * 2/2023 Marchildon ............... B62J 9/27

(Continued)

*Primary Examiner* — Justin M Larson
(74) *Attorney, Agent, or Firm* — Womble Bond Dickinson (US) LLP

(57) ABSTRACT

A quick-release device by which an object such as a tent, pod, axe or jack can be easily and quickly attached and detached from a rack. The device has front and rear brackets, where the front brackets have a lower front bracket on the roof rack with a slot, and an upper front bracket on the bottom of the tent with a tongue that slides into the slot. The upper rear bracket has a hole, into the which a spring-loaded knob from the lower rear bracket on the roof rack removably fits, thereby securing the tent to the roof rack. To remove the tent, one only has to pull back on the knobs, push the tent up, then slide it forward to pull the tongues out of the slots. Prop rods rotate down from the bottom of the tent to allow the tent to be temporarily propped up.

19 Claims, 11 Drawing Sheets

(56) References Cited

U.S. PATENT DOCUMENTS

| | | | | |
|---|---|---|---|---|
| 11,578,499 | B2 * | 2/2023 | Currid | B60R 9/045 |
| 11,890,996 | B2 * | 2/2024 | Jackson | B60R 11/06 |
| D1,075,989 | S * | 5/2025 | Hernandez | D21/839 |
| 12,398,577 | B2 * | 8/2025 | Tillman-Davis | E04H 15/06 |
| 2007/0257076 | A1 * | 11/2007 | Hurd | B60R 9/055<br>224/329 |
| 2008/0073396 | A1 * | 3/2008 | Chiang | B62J 9/23<br>280/202 |
| 2012/0261520 | A1 * | 10/2012 | Groomes | F16M 11/10<br>244/234 |
| 2023/0406230 | A1 * | 12/2023 | Jackson | B60R 11/06 |
| 2025/0074318 | A1 * | 3/2025 | Hernandez | B60R 9/048 |

* cited by examiner

QUICK RELEASE TENT MOUNT

CROSS REFERENCE TO RELATED APPLICATIONS

This utility patent application claims priority back to U.S. Provisional Application No. 63,536,461, also entitled "Quick Release Tent Mount", which the same inventor, Kris Hernandez, citizen of US, and the same applicant, Wheel Pros, LLC, of Greenwood, CO, US, filed Sep. 4, 2023, the contents of which are incorporated by reference.

STATEMENT REGARDING FEDERALLY SPONSORED RESEARCH OR DEVELOPMENT

This invention was not federally sponsored.

Field of the Invention

This disclosure is directed generally to devices that removably secure tents, travel pods, and other items to the roof rack or bed rack of a car or trailers, and more specifically to a device that allows a tent or other item to be quickly and easily attached and detached from a roof rack on a vehicle or trailer. It is contemplated that the invention can also be used to quickly attach and remove any object with which two or more mounting brackets can be attached to any surface or panel of a vehicle or trailer.

A second embodiment of the invention involves the use of the same general technology to removably attach a light device such as a shovel, axe, or jack, fishing rode to a roof rack of a car or trailer.

Problem Stated

Attaching items to the roofs of vehicles has long presented problems. In the 1960's surf racks attached to the rain gutters of vehicles could carry surfboards and other objects that did not fit conveniently inside the vehicle. Over time, vehicle manufacturers began developing vehicles with built-in cargo racks, generally comprising two rails which allowed for two cross bars to slide up and down the rails depending on where the user wanted to locate them.

This worked very well for surfboards, pool cleaning nets, lumber and other items that could be secured to the cross bars with rope or ratcheting devices, but were difficult for use when the user wanted to attach a travel pod, tent or other large item that couldn't be just "tied to the cross bars". Many of these tents and travel pods have convoluted, complex, and difficult to use means of attachment. For example, one of the popular models requires a user to climb up the side of his/her car, locate a clamp perfectly aligned with a hole of the bottom of the pod with a cross bar, then lower the clamp and screw two pincer bars together to "clamp" onto the cross bar. This is obviously quite difficult, and for an older or less physically fit user, it can be downright dangerous to attach and remove a tent or travel pod from a vehicle.

Solution Provided

The current invention avoids all this complexity and difficulty have providing a fast, easy and safe means by which a user can attach a tent, travel pod or other large device to the roof rack of a vehicle.

Brief Description of the Invention

In a preferred embodiment, the quick-release device has two sets of interlocking brackets, a "front" set toward the passenger section of the car, and a "rear" set toward the back of the car. The front brackets have a lower front bracket on the roof rack with a slot, and an upper front bracket on the bottom of the tent with a tongue that slides into the slot. The upper rear bracket has a hole, into the which a spring-loaded knob from the lower rear bracket on the roof rack removably fits, thereby securing the tent to the roof rack. As the tent slides down, the end of the knob is pushed back, then snaps into the hold on the upper rear bracket. Bump stops on the outer surface of all the brackets cushion the contact between the various brackets. To remove the tent, one only has to pull back on the knobs, push the tent up, then slide it forward to pull the tongues out of the slots. Prop rods rotate down from the bottom of the tent to allow the tent to be temporarily propped up.

In other embodiments, smaller and lighter items can be attached to a roof rack or other structure on a vehicle or trailer through the use of a single front bracket and a single rear bracket.

There has thus been outlined, rather broadly, the more important features of the invention in order that the detailed description thereof may be better understood, and in order that the present contribution to the art may be better appreciated. There are additional features of the invention that will be described hereinafter, and which will form the subject matter of the claims appended hereto. The features listed herein, and other features, aspects and advantages of the present invention will become better understood with reference to the following description and appended claims. The accompanying drawings, which are incorporated in and constitute part of this specification, illustrate embodiments of the invention and, together with the description, serve to explain the principles of the invention.

It should be understood the while the preferred embodiments of the invention are described in some detail herein, the present disclosure is made by way of example only and that variations and changes thereto are possible without departing from the subject matter coming within the scope of the following claims, and a reasonable equivalency thereof, which claims I regard as my invention.

DETAILED DESCRIPTION OF PREFERRED EMBODIMENT

As a brief summary, the invention provides a quick and easy way in which a tent or travel pod can be attached to a vehicle or trailer rack, and removed therefrom. The invention comprises two sets of removably interlocking brackets: a front and a rear set of brackets, where the front brackets have a lower front bracket on the roof rack with a slot, and an upper front bracket on the bottom of the tent with a tongue that slides into the slot. The upper rear bracket has a hole, into the which a spring-loaded knob from the lower rear bracket on the roof rack removably fits, thereby securing the tent to the roof rack. To remove the tent, one only has to pull back on the knobs, push the tent up, then slide it forward to pull the tongues out of the slots. Prop rods rotate down from the bottom of the tent to allow the tent to be temporarily propped up. A padlock can be secured in holes that line up in the rear tent bracket and the rear rack bracket to lock the tent to the rack to prevent theft.

In another, simpler embodiment of the idea, a single set of front and rear brackets can be interlocked to secure a light object, such as a shovel, jack, axe or fishing pole, from a vehicle or trailer rack or panel.

Figure 1:
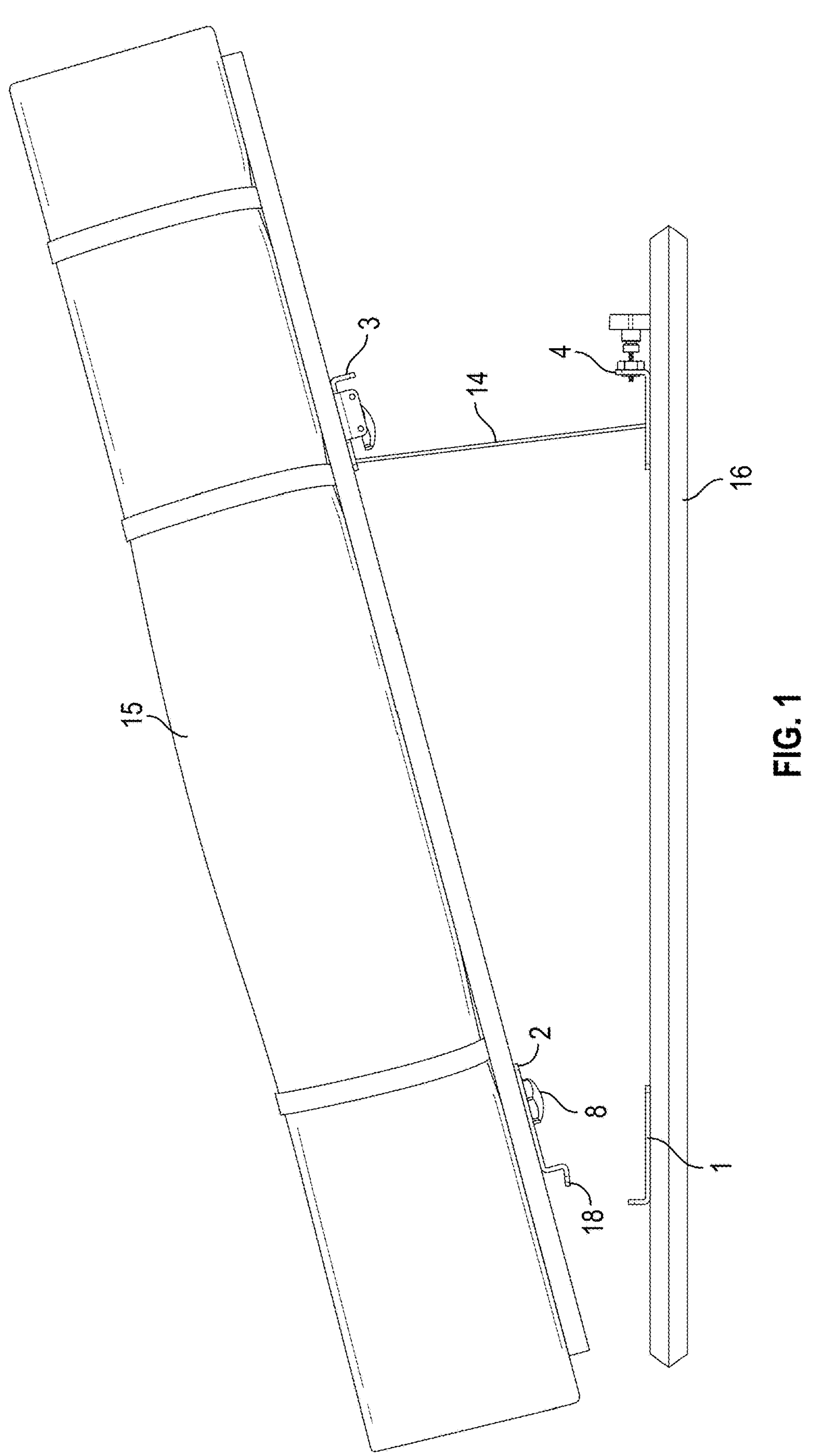
FIG. 1 is a side view of a tent being lowered onto a rack.

FIG. 1 is a side view of a tent 15 being lowered onto a rack 16. At the end of the tent closest to the cab of the vehicle (or front of the trailer) is a front tent bracket 2 with an open slot 17. On the end of the rack closest to the cab of the vehicle (or front of the trailer) is a front rack bracket 1, with a tongue 18. It is important to note that this tent can be lowered onto the roof by two people standing on the ground, and does not require anyone to climb up the side of the vehicle and reach down to clamp the tent to the roof rack. A user merely rests the tent 15 on a prop rod 14, then slides the tongue 18 into the front bracket 1. This prevents the tent from moving forward.

Figure 2:
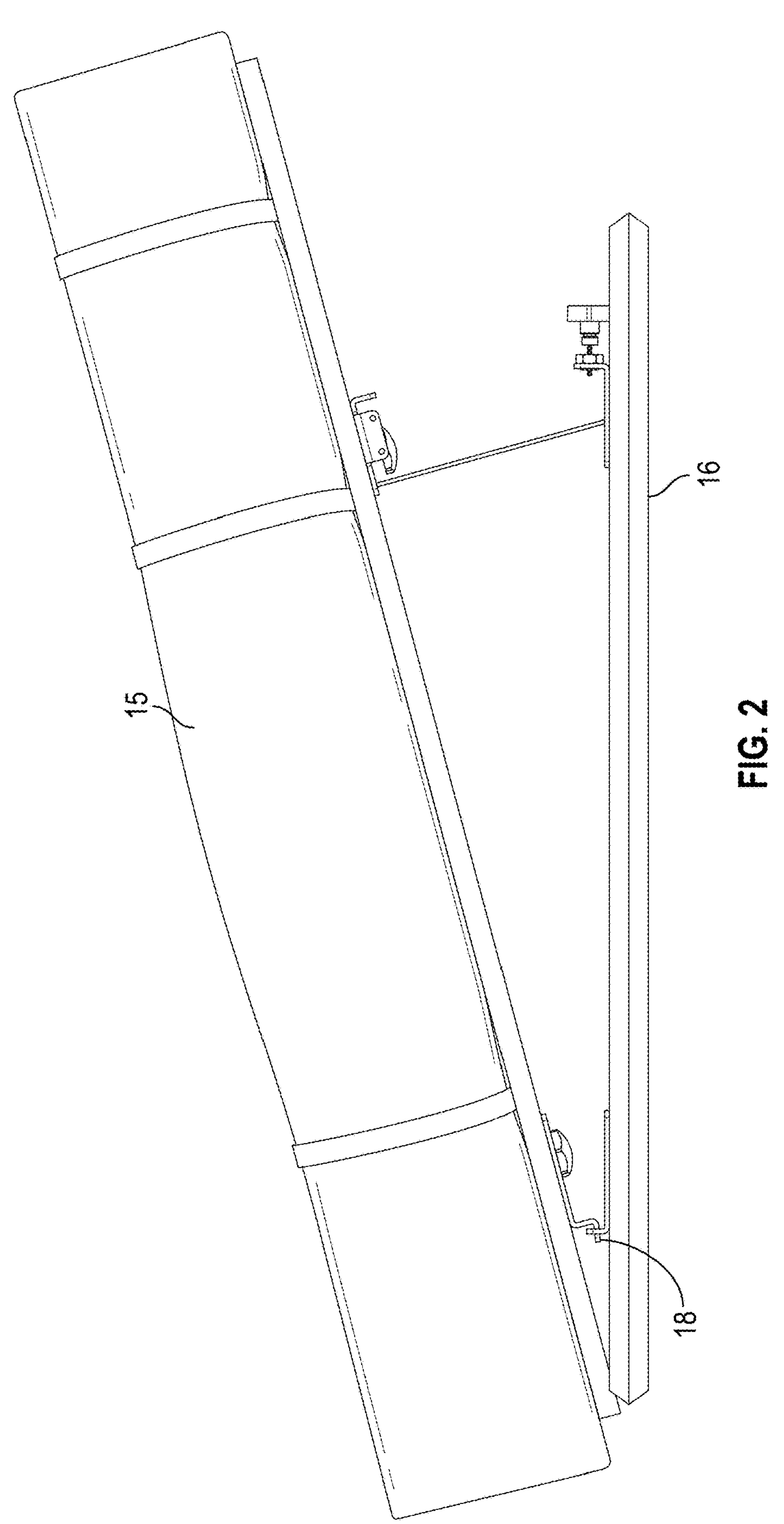
FIG. 2 is a side view of the tent having its front assemblies interlocked.

FIG. 2 is a side view of the tent having its front assemblies interlocked. In this figure, the tongue 18 on the front tent bracket 2 has slid into the slot in the front rack bracket. This prevents the tent from moving forward, although it still can move backward. Thus, a user needs only to position the tent above the roof rack and slide the front into a locking bracket. This part of the installation requires no screws, bolts, clamps or other mechanical devices-only sliding the tent into the bracket.

Figure 3:
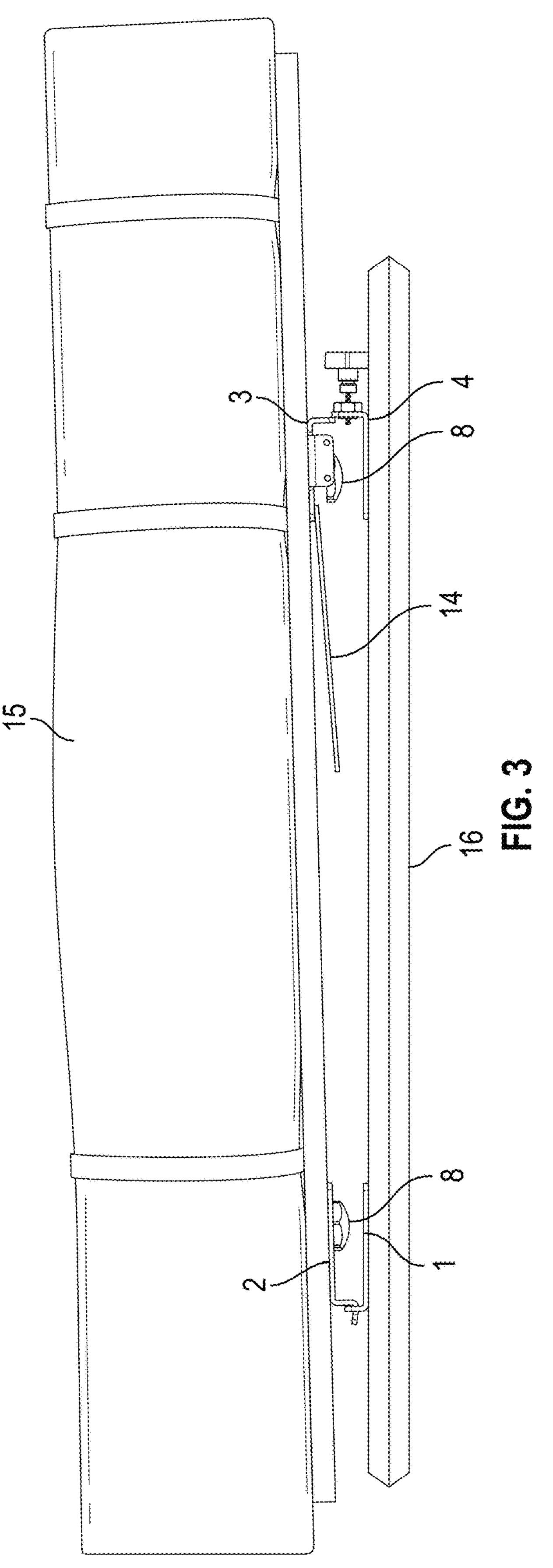
FIG. 3 is a side view of the tent where the front assemblies have interlocked, and the rear of the tent is being lowered onto the end of the spring-loaded knob.

FIG. 3 is a side view of the tent where there front assemblies have interlocked and the rear of the tent is being lowered onto the spring-plunger (6 in later figures) of the spring-loaded knob (5 in later figures). The rear tent bracket 4 has a lock hole 13, that is aligned with the spring plunger on the knob. One of the key conveniences of this invention is that it allows for the complete installation of the tent without any bolting, screwing, climbing up the side of the vehicle, or complicated alignments of internal clamps through holes in the bottom of the tent base. All this is necessary is to align the front portion with the front bracket, then lower the back portion to snap into place with the spring-loaded knob. Removal is just as simple. It only requires a user to disengage the spring-loaded knob, then lift the back to tent up into the air, rest it on the prop rod 14, then get two people, one on each side, and slide the tongue out of the front bracket, walk the tent backwards or forwards to place it on the ground or in a storage dolly.

Figure 4:
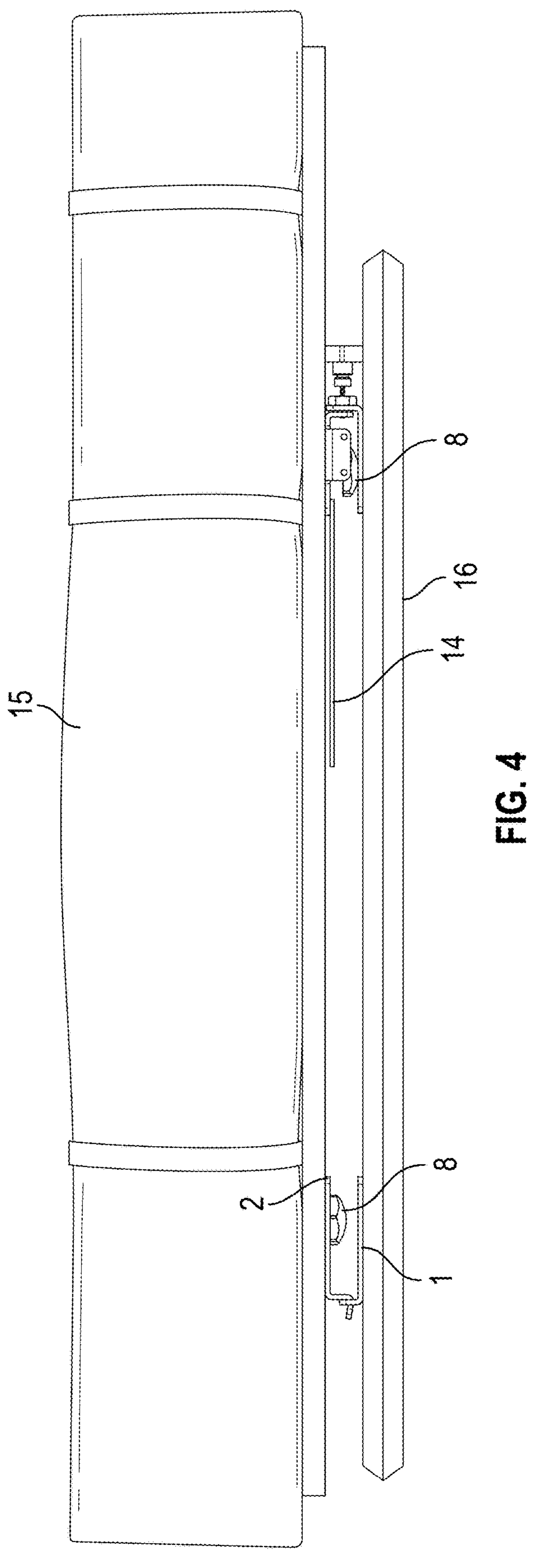
FIG. 4 is a side view of the tent after it has been lowered all the way onto the rack such that the pin at the end of the knob has entered the hole in the upper device to temporarily secure the tent to the rack.

FIG. 4 is a side view of the tent 15 after it has been lowered all the way onto the rack 16 such that the spring plunger of the knob has entered the rear tent bracket hole to temporarily secure the tent to the rack. To detach the tent from the rack, a user merely pulls back on the knob 5 to disengage the spring plunger from the rear tent bracket hole, and then rotate the tent up. The tent can be propped up by rotating the prop rod 14 from the bottom of the tent, and propping the prop rod 14 up on the rear rack bracket.

Figure 5:
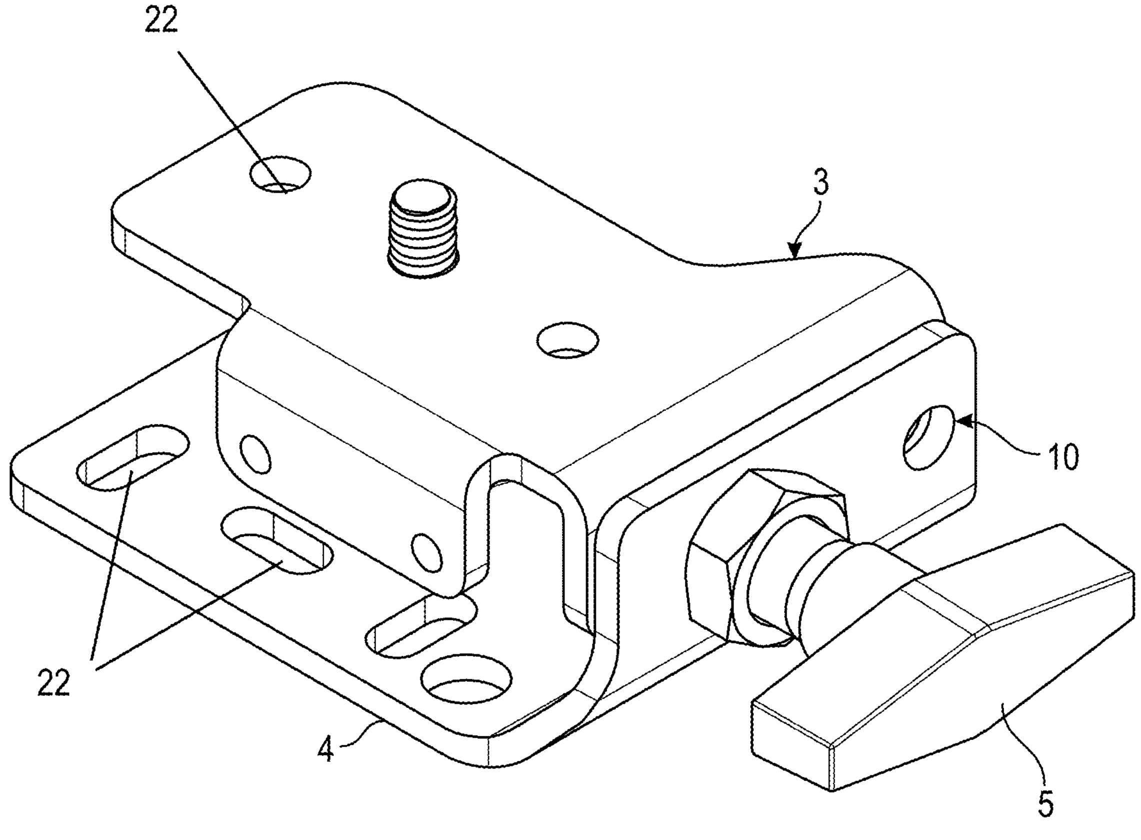
FIG. 5 is a perspective view of the rear rack bracket.

FIG. 5 is a perspective view of the rear rack bracket. The knob 5 can be pulled back to release the pin that is spring-tensioned into the aligned holes 22 of the rear tent bracket 3 and the rear rack bracket 4. A cotter pin can be inserted into the cotter pin or padlock hole 10 to further secure the tent to the roof rack.

Figure 6:
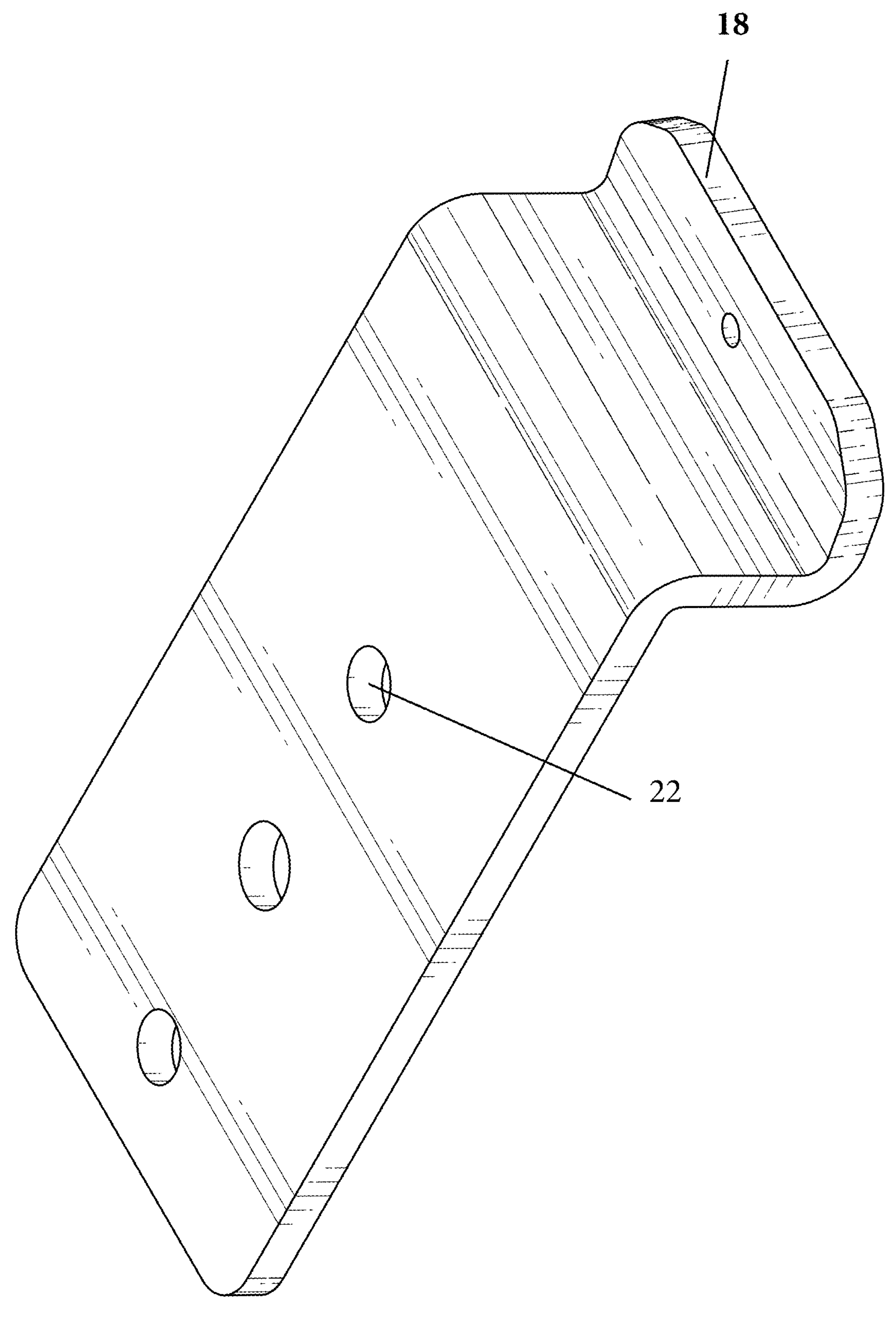
FIG. 6 is a perspective view of the tent front bracket.

FIG. 6 is a perspective view of the tent front bracket, showing the tongue 18, that slides into the slot (17 in FIG. 7) as a first step in attaching the tent to the roof rack. Bolt holes 22 allow the various brackets to be attached to the tent and the rack.

Figure 7:
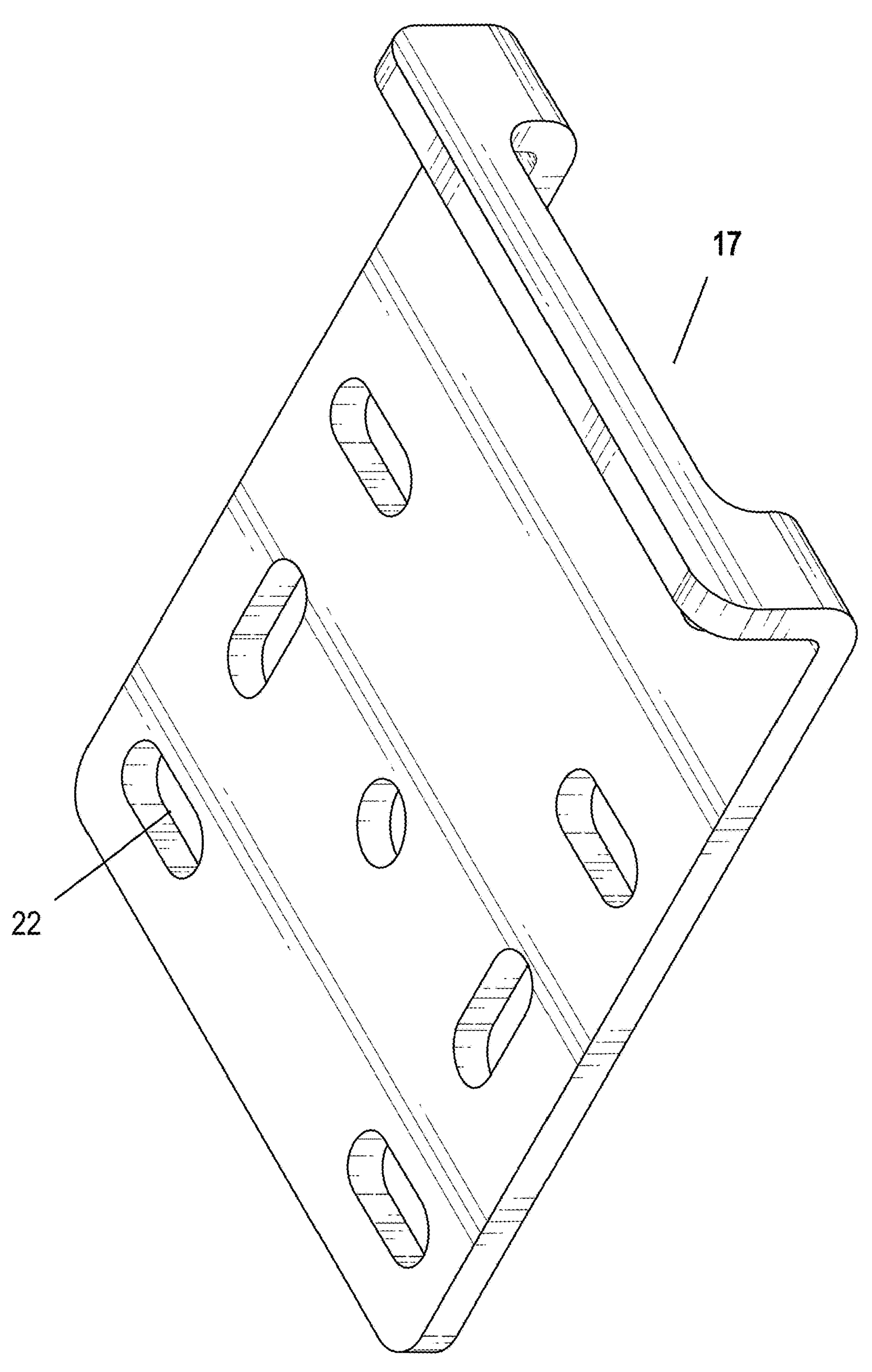
FIG. 7 is a perspective view of the rack front bracket.

FIG. 7 is a perspective view of the rack front bracket showing the slot 17, into which the tongue (18 in FIG. 6) is slid to attach the front of the tent to the front of the rack. Bolt holes 22 allow the various brackets to be attached to the tent and the rack.

Figure 8:
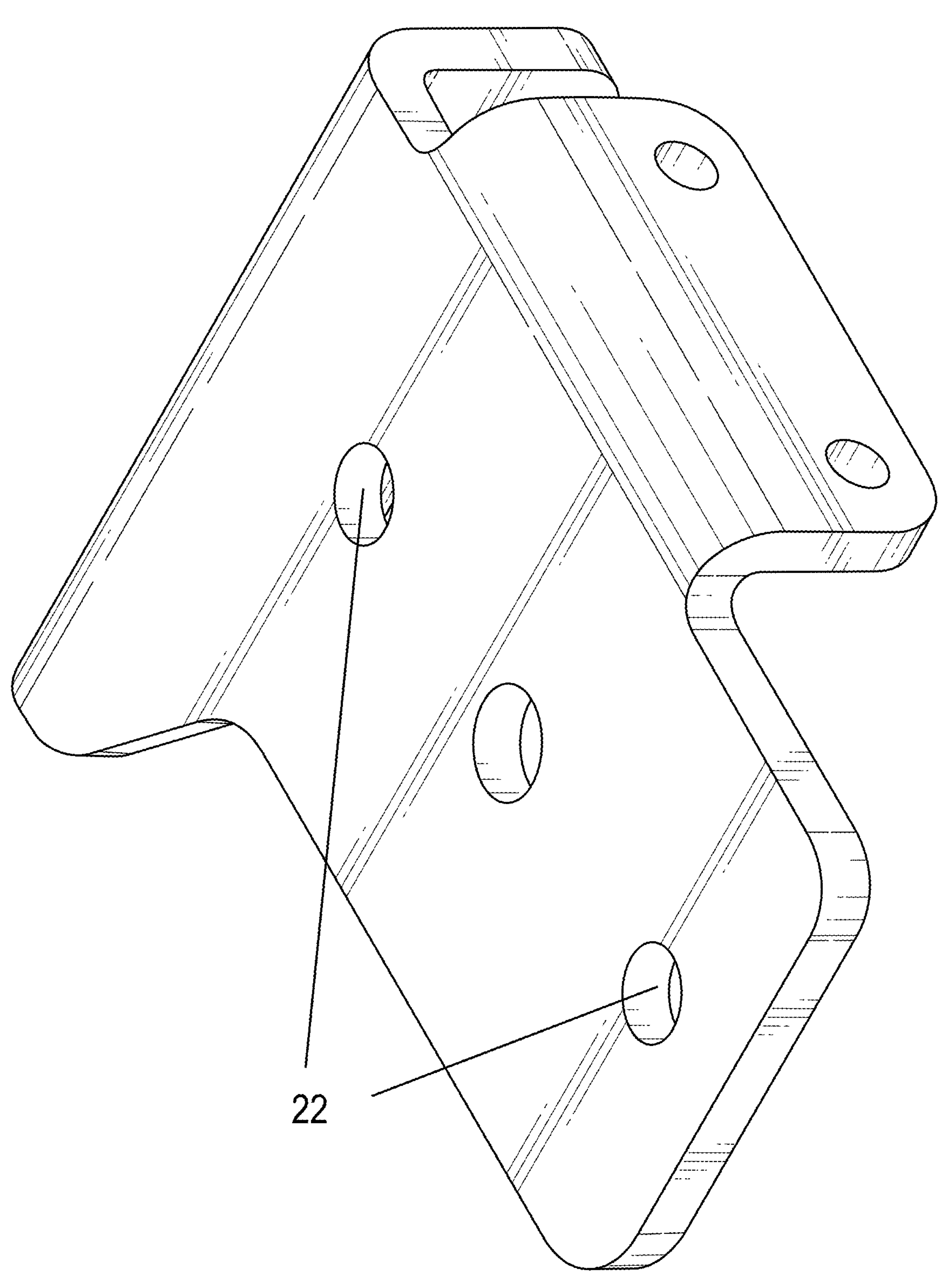
FIG. 8 is a perspective view of the tent front bracket.

FIG. 8 is a perspective view of the tent front bracket. Bolt holes 22 allow the various brackets to be attached to the tent and the rack.

Figure 9:
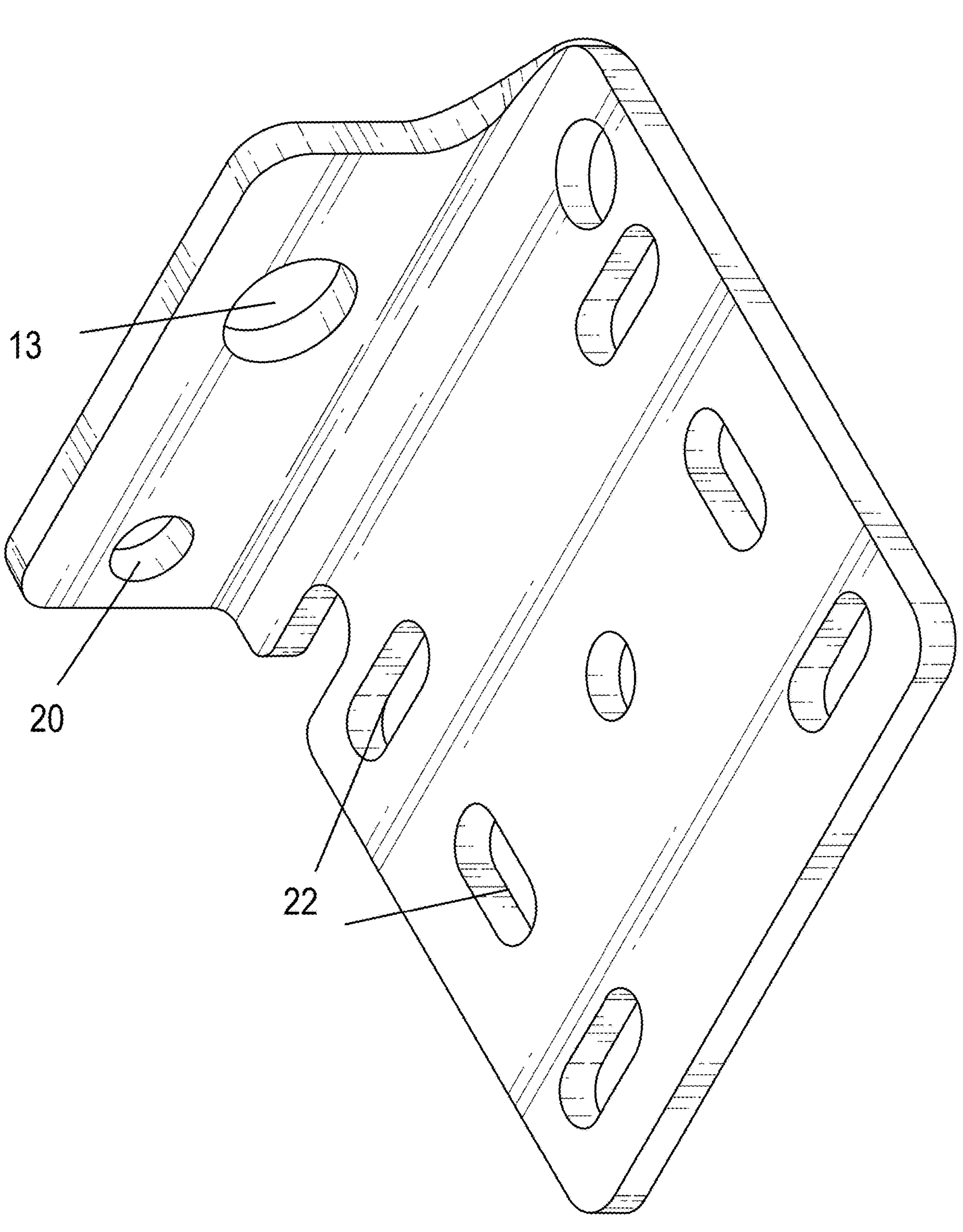
FIG. 9 is a perspective view of the tent rear bracket.

FIG. 9 is a perspective view of the tent rear bracket. Note the lock hole 13, into which the spring-loaded pin is inserted and through which it enters an aligned hole in the tent front bracket. Note also the cotter pin or padlock hole 20, which aligns with a corresponding cotter pin or padlock hole (10 in other figures) in the tent front bracket. This allows a user to secure the tent to the rack with a padlock or padlock.

Figure 10:
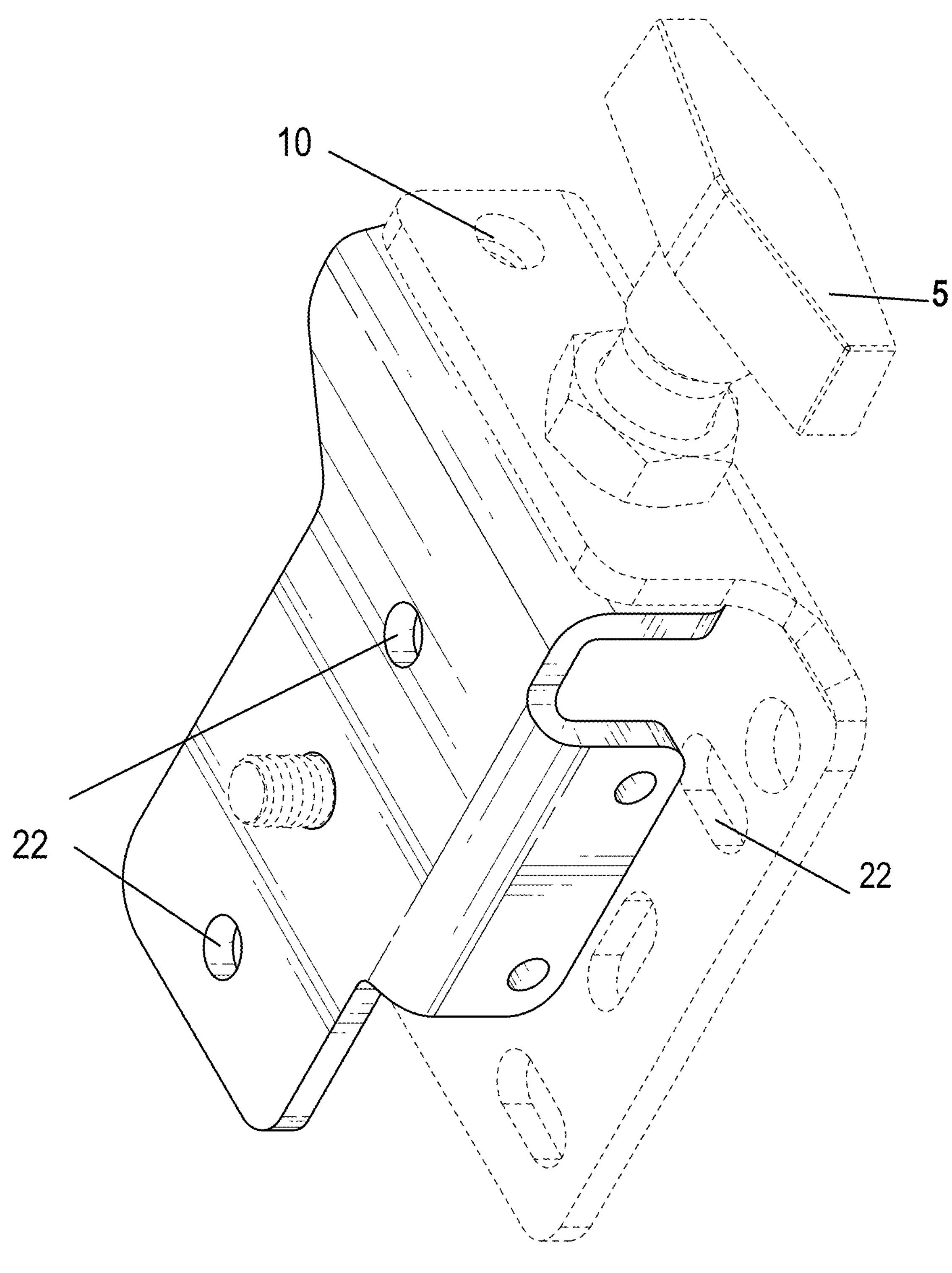
FIG. 10 is a perspective view of the rack rear bracket and the rear tent bracket removably connected with the spring-loaded pin and knob.

FIG. 10 is a perspective view of the rack rear bracket and the rear tent bracket removably connected with the spring-loaded pin and knob 5. In this figure, because there is no padlock in the tent cotter pin or padlock hole 10, the user needs to merely pull back on the knob 5, to disengage the pin from the corresponding hole in the tent rear bracket, at which point the user can push up the tent and either prop it up with the prop rods, or remove it entirely from the rack. Bolt holes 22 allow the various brackets to be attached to the tent and the rack.

Figure 11:
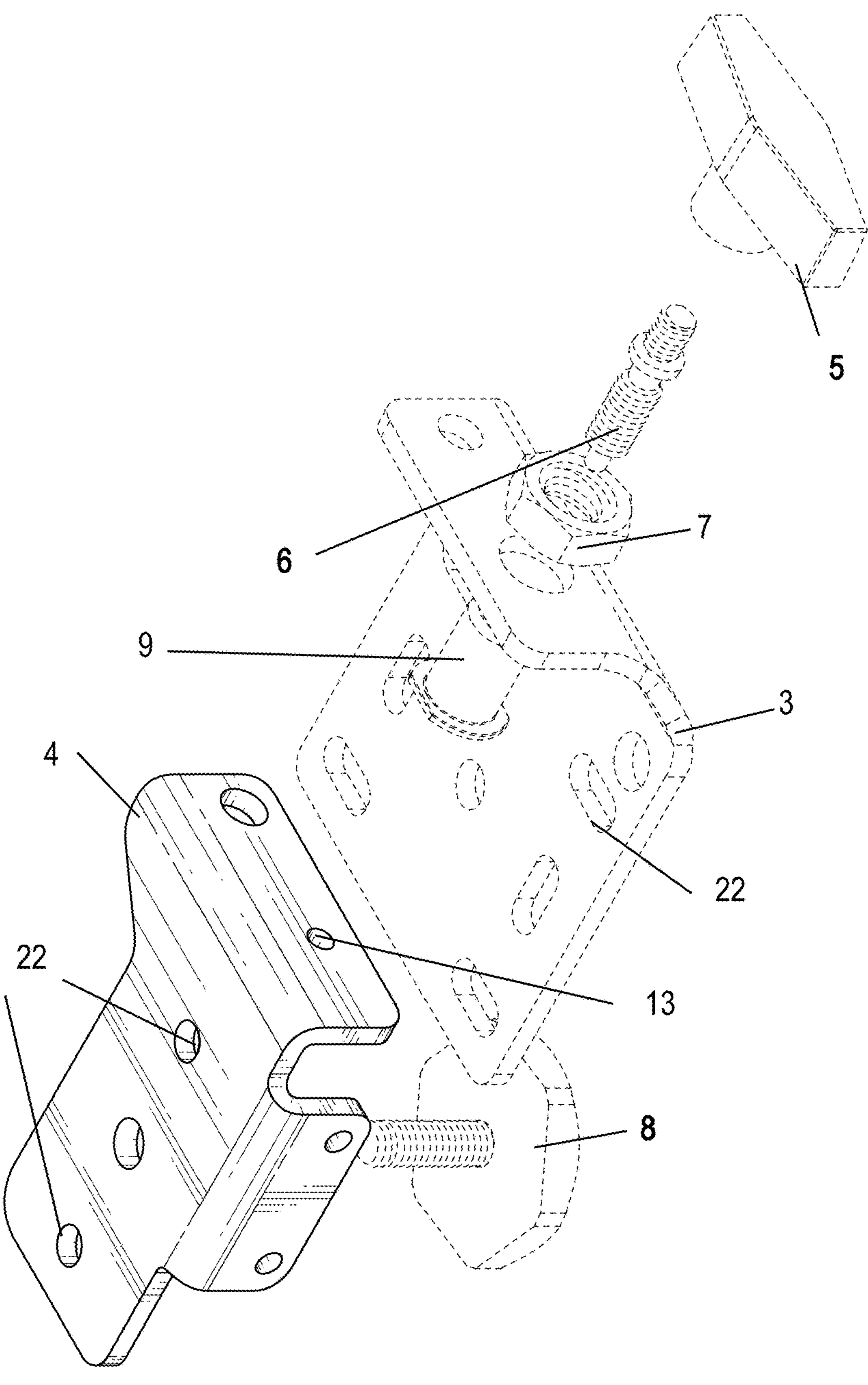
FIG. 11 is an exploded perspective view of the rack rear bracket and the rear tent bracket removably connected with the spring-loaded pin and knob, showing the knob and pin in exploded view.

FIG. 11 is an exploded perspective view of the rack rear bracket 3 and the rear tent bracket 4 removably connected with the spring-loaded pin 6 and knob 5, showing the knob and pin in exploded view. The spring-loaded pin 6 is secured by a hex nut 7 and screws into a pin housing 9, which contains a spring. With the pin 6 inserted into the lock hole 13, the rear tent bracket is secured to the rear rack bracket. This figure also shows a bump stop 8, which provides a cushion between the tent and the rack. This illustrates the simplicity of the invention, as well as the ease of use. To summarize, a user merely needs to slide the top on the front of the tent into a slot of the front rack bracket, then lower the rear of the tent such that the spring-loaded pin 6 snaps into the lock hole 13, thereby securing the tent to the roof rack in one easy maneuver.

It should be noted that the same general technology can be used to removably secure a tool, fishing rod or other lightweight device to the roof rack of a vehicle or trailer. Take, for example, a fire-fighting axe. A front bracket can be screwed into the front of the axe, with a back bracket screwed into the back of the axe. The front axe bracket has a tongue which slips into a slot on a roof rack bracket. The rear axe bracket removably mates with the same type of spring-loaded knob on the back roof rack bracket. This allows a firefighter to quickly secure, or quickly remove, the axe when needed.

In the tent-mount embodiment, a preferred embodiment calls for a quick-release device for temporality securing a tent, travel pod or other device to a roof rack of a car or trailer. The device has a front assembly, wherein the front assembly comprises two front tent brackets and two front rack brackets, wherein, each front tent bracket comprises a front tent flat section that is attached to a tent, a bump stop hole, a bump stop, and a tongue, wherein, each front rack bracket comprises a front rack flat section that is attached to a rack, and a slot. In this embodiment, the tongue is inserted into the slot to temporarily secure the front tent bracket to the front rack bracket, and the bump stop provides a cushioning effect between the front rack bracket and the front tent bracket. This embodiment also has a rear assembly, wherein the rear assembly comprises two rear tent brackets and two rear rack brackets. Each rear tent bracket comprises a rear tent flat section that is attached to the tent, a bump stop hole, a bump stop, and a lock hole. Each rear rack bracket comprises a rear rack flat section that is attached to the rack, and a knob that has a spring-loaded pin, where the spring-loaded pin lines up with the lock hole when the tent is lowered onto the rack. As the tent is lowered onto the rack, the spring-loaded pin is pulled back by the knob, as the tent is seated on the rack, wherein the knob is released and the spring-loaded pin is inserted into the lock hole, thereby removably securing the tent to the rack, wherein each bump stop provides an amount of cushioning between the front rack bracket and the front tent bracket, and between the rear rack bracket and the rear tent bracket. This first embodiment also provides a pin housing and a hex nut, where the hex nut secures the spring-loaded pin to the pin housing, wherein the pin housing comprises a spring, which provides the spring-loading to the spring loaded pin, where the pin housing is attached to the rear rack bracket. Two prop rods hold the back of the tent up while the user gets ready to lower it. Each prop rod is rotationally secured to one of the rear tent brackets, and rotates in a downward direction to rest upon a seat in the rear rack bracket, thereby allowing the tent to be propped up in an upper position. The brackets for both the tent and the roof rack have holes through which their respective brackets are secured, through screws and/or bolts, to the tent or roof rack.

A second embodiment of the same general technology provides a quick-release device for temporality securing a shovel, axe, jack, fishing rode or other light device to a roof rack of a car or trailer. This second embodiment has a front assembly, wherein the front assembly comprises a front object bracket and a front rack bracket, The front object bracket comprises a front object flat section that is attached to an object, a bump stop hole, a bump stop, and a tongue, wherein, the front rack bracket comprises a front rack flat section that is attached to a rack, and a slot. As with the tent embodiment, a tongue is inserted into the slot to temporarily secure the front object bracket to the front rack bracket, and the bump stop provides a cushioning effect between the front rack bracket and the front tent bracket. Also similar to the tent embodiment, the rear assembly comprises a rear object bracket and a rear rack bracket.

wherein, each rear object bracket comprises a rear object flat section that is attached to the object, a bump stop hole, a bump stop, and a rear object bracket hole. With this "tool embodiment", the rear rack bracket comprises a rear rack flat section that is attached to the rack, and a knob that has a spring-loaded pin, where the spring-loaded pin lines up with a lock hole on the rear object bracket when the object is lowered onto the rack. As the object is lowered onto the rack, the spring-loaded pin is pulled back by the knob as the object is seated on the rack, wherein the knob is released and the spring-loaded pin is inserted into the lock hole, thereby removably securing the object to the rack. As with the tent embodiment, the rear rack bracket additionally comprises a pin housing and a hex nut, where the hex nut secures the spring-loaded pin to the pin housing, wherein the pin housing comprises a spring, which provides the spring-loading to the spring loaded pin, where the pin housing is attached to the rear rack bracket. The tool embodiment has optional prop rods, similar to those in the tent embodiment. The brackets for both the object and the roof rack have holes through which their respective brackets are secured, through screws and/or bolts, to the tent or roof rack.

Each of the additional figures and methods disclosed herein can be used separately, or in conjunction with other features and methods, to provide improved devices and methods for making and using the same. Therefore, combinations of features and methods disclosed herein may not be necessary to practice the disclosure in its broadest sense and are instead disclosed merely to particularly describe representative and preferred embodiments.

Various modifications to the embodiments may be apparent to one of skill in the art upon reading this disclosure. For example, persons of ordinary skill in the relevant arts will recognize that the various features described for the different embodiments can be suitably combined, un-combined, and re-combined with other features, alone, or in different combinations. Likewise, the various features described above should all be regarded as example embodiments, rather than limitations to the scope or spirit of the disclosure.

Persons of ordinary skill in the relevant arts will recognize that various embodiments can comprise fewer features than illustrated in any individual embodiment described above. The embodiments described herein are not meant to be an exhaustive presentation of the ways in which the various features may be combined. Accordingly, the embodiments are not mutually exclusive combinations of features; rather, the claims can comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

Unless indicated otherwise, references to "embodiment (s)", "disclosure", "present disclosure", "embodiment(s) of the disclosure", "disclosed embodiment(s)", and the like contained herein refer to the specification (text, including the claims, and figures) of this patent application that are not admitted prior art.

For purposes of interpreting the claims, it is expressly intended that the provisions of 35 U.S.C. 112 (f) are not to be invoked unless the specific terms "means for" or "step for" are recited in the respective claim.

It should be understood that while the preferred embodiments of the invention are described in some detail herein, the present disclosure is made by way of example only and that variations and changes thereto are possible without departing from the subject matter coming within the scope of the following claims, and a reasonable equivalency thereof, which claims I regard as my invention.

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

What I claim is:

1. A quick-release device for temporarily securing a tent, travel pod or other device to a roof rack of a car or trailer, the quick-release device consisting of:

a front assembly, wherein the front assembly comprises two front tent brackets and two front rack brackets, wherein:

each front tent bracket comprises a front tent flat section that is attached to a tent, a bump stop hole, a bump stop, and a tongue, each front rack bracket comprises a front rack flat section that is attached to a rack, each front rack bracket comprises a slot, the tongue is inserted into the slot to temporarily secure the front tent bracket to the front rack bracket, and the bump stop provides a cushioning effect between the front rack bracket and the front tent bracket:

a rear assembly, wherein:

the rear assembly comprises two rear tent brackets and two rear rack brackets, each rear tent bracket comprises a rear tent flat section that is attached to the tent, a bump stop hole, a bump stop, and a lock hole, each rear rack bracket comprises a rear rack flat section that is attached to the rack, each rear rack bracket comprises a knob that has a spring-loaded pin, the spring-loaded pin lines up with the lock hole when the tent is lowered onto the rack, as the tent is lowered onto the rack, the spring-loaded pin is pulled back by the knob as the tent is seated on the rack, the knob is released and the spring-loaded pin is inserted into the lock hole thereby removably securing the tent to the rack, and each bump stop provides an amount of cushioning between the respective front rack bracket and the respective front tent bracket and provides an amount of cushioning between the respective rear rack bracket and the respective rear tent bracket; and two prop rods, each prop rod rotationally secured to one of the rear tent brackets and rotates in a downward direction to rest upon a seat in the respective rear rack bracket thereby allowing the tent to be propped up in an upper position.

2. The device of claim 1, wherein each of the rear rack brackets additionally comprises a pin housing and a hex nut, where the hex nut secures the spring-loaded pin to the pin housing, wherein the pin housing comprises a spring, which provides the spring-loading to the spring-loaded pin.

3. The device of claim 2, wherein each pin housing is attached to the respective rear rack bracket.

4. The device of claim 1, wherein each front tent flat section is attached to the tent through one or more front tent screws inserted through one or more front tent screw holes, wherein each front rack flat section is attached to the rack through one or more front rack screws inserted through one or more front rack screw holes, wherein each rear tent flat section is attached to the tent through one or more rear tent screws inserted through one or more rear tent screw holes, wherein, each rear rack flat section is attached to the rack through one or more rear rack screws inserted through one or more rear rack screw holes.

5. The device of claim 1, wherein each front tent flat section is attached to the tent through one or more front tent bolts inserted through one or more front tent bolts holes, wherein each front rack flat section is attached to the rack through one or more front rack bolts inserted through one or more front rack bolts holes, wherein each rear tent flat section is attached to the tent through one or more rear tent bolts inserted through one or more rear tent bolts holes, wherein, each rear rack flat section is attached to the rack through one or more rear rack bolts inserted through one or more rear rack bolts holes.

6. A quick-release device for temporality securing a shovel, axe, jack, fishing rod or other light device to a roof rack of a car or trailer, the quick-release device comprising:

a front assembly, wherein the front assembly comprises a front object bracket and a front rack bracket, wherein:

the front object bracket comprises a front object flat section that is attached to an object, a bump stop hole, a bump stop, and a tongue, the front rack bracket comprises a front rack flat section that is attached to a rack, each front rack bracket comprises a slot, the tongue is inserted into the slot to temporarily secure the front object bracket to the front rack bracket, and the bump stop provides a cushioning effect between the front rack bracket and the front object bracket; and a rear assembly, wherein:

the rear assembly comprises one or more rear object brackets and a rear rack bracket, each of the one or more rear object brackets comprises a rear object flat section that is attached to the object, a bump stop hole, a bump stop, and a rear object bracket hole, the rear rack bracket comprises a rear rack flat section that is attached to the rack, the rear rack bracket comprises a knob that has a spring-loaded pin, the spring-loaded pin lines up with a lock hole on each of the rear object brackets when the object is lowered onto the rack, as the object is lowered onto the rack, the spring-loaded pin is pulled back by the knob as the object is seated on the rack, and the knob is released and the spring-loaded pin is inserted into the lock hole thereby removably securing the object to the rack.

7. The device of claim 6, wherein the rear rack bracket additionally comprises a pin housing and a hex nut, where the hex nut secures the spring-loaded pin to the pin housing, wherein the pin housing comprises a spring, which provides the spring-loading to the spring-loaded pin.

8. The device of claim 7, wherein the pin housing is attached to the rear rack bracket.

9. The device of claim 8, additionally comprising one or more prop rods, where each prop rod is rotationally secured to one of the rear object brackets, and rotates in a downward direction to rest upon a seat in the rear rack bracket, thereby allowing the object to be propped up in an upper position.

10. The device of claim 8, wherein each front object flat section is attached to the object through one or more front object screws inserted through one or more front object screw holes, wherein each front rack flat section is attached to the rack through one or more front rack screws inserted through one or more front rack screw holes, wherein each rear object flat section is attached to the object through one or more rear object screws inserted through one or more rear object screw holes, wherein, each rear rack flat section is attached to the rack through one or more rear rack screws inserted through one or more rear rack screw holes.

11. The device of claim 8, wherein each front object flat section is attached to the object through one or more front object bolts inserted through one or more front object bolts holes, wherein each front rack flat section is attached to the rack through one or more front rack bolts inserted through one or more front rack bolts holes, wherein each rear object flat section is attached to the object through one or more rear object bolts inserted through one or more rear object bolts holes, wherein, each rear rack flat section is attached to the rack through one or more rear rack bolts inserted through one or more rear rack bolts holes.

12. A quick-release device for temporality securing a tent, travel pod or other device to a roof rack of a car or trailer, the quick release device comprising;

a front assembly, wherein:

the front assembly comprises two front tent brackets and two front rack brackets, each front tent bracket comprises a front tent flat section that is attached to a tent, a bump stop hole, a bump stop, and a tongue, each front rack bracket comprises a front rack flat section that is attached to a rack, each front rack bracket comprises a slot, the tongue is inserted into the slot to temporarily secure the front tent bracket to the front rack bracket, and the bump stop provides a cushioning effect between the front rack bracket and the front tent bracket; and a rear assembly, wherein:

the rear assembly comprises two rear tent brackets and two rear rack brackets, each rear tent bracket comprises a rear tent flat section that is attached to the tent, a bump stop hole, a bump stop, and a lock hole, each rear rack bracket comprises a rear rack flat section that is attached to the rack, each rear rack bracket comprises a knob that has a spring-loaded pin, the spring-loaded pin lines up with the lock hole when the tent is lowered onto the rack, as the tent is lowered onto the rack, the spring-loaded pin is pulled back by the knob as the tent is seated on the rack, the knob is released and the spring-loaded pin is inserted into the lock hole thereby removably securing the tent to the rack, and each bump stop provides an amount of cushioning between the respective front rack bracket and the respective front tent bracket and provides an amount of cushioning between the respective rear rack bracket and the respective rear tent bracket.

13. The device of claim 12, where each of the rear rack brackets additionally comprises a pin housing and a hex nut, where the hex nut secures the spring-loaded pin to the pin housing, wherein the pin housing comprises a spring, which provides the spring-loading to the spring-loaded pin, where the pin housing is attached to the respective rear rack bracket, wherein each front tent flat section is attached to the tent through one or more front tent screws inserted through one or more front tent screw holes, wherein each front rack flat section is attached to the rack through one or more front rack screws inserted through one or more front rack screw holes, wherein each rear tent flat section is attached to the tent through one or more rear tent screws inserted through one or more rear tent screw holes, wherein, each rear rack flat section is attached to the rack through one or more rear rack screws inserted through one or more rear rack screw holes.

14. The device of claim 12, where each of the rear rack brackets additionally comprises a pin housing and a hex nut, where the hex nut secures the spring-loaded pin to the pin housing, wherein the pin housing comprises a spring, which provides the spring-loading to the spring-loaded pin.

15. The device of claim 14, where each the pin housing is attached to the respective rear rack bracket.

16. The device of claim 15, additionally comprising two prop rods, where each prop rod is rotationally secured to one of the rear tent brackets, and rotates in a downward direction to rest upon a seat in the respective rear rack bracket, thereby allowing the tent to be propped up in an upper position.

17. The device of claim 15, additionally comprising two prop rods, where each prop rod is rotationally secured to one of the rear tent brackets, and rotates in a downward direction to rest upon a seat in the respective rear rack bracket, thereby allowing the tent to be propped up in an upper position.

18. The device of claim 17, wherein each front tent flat section is attached to the tent through one or more front tent screws inserted through one or more front tent screw holes, wherein each front rack flat section is attached to the rack through one or more front rack screws inserted through one or more front rack screw holes, wherein each rear tent flat section is attached to the tent through one or more rear tent screws inserted through one or more rear tent screw holes, wherein, each rear rack flat section is attached to the rack through one or more rear rack screws inserted through one or more rear rack screw holes.

19. The device of claim 17, wherein each front tent flat section is attached to the tent through one or more front tent bolts inserted through one or more front tent bolts holes, wherein each front rack flat section is attached to the rack through one or more front rack bolts inserted through one or more front rack bolts holes, wherein each rear tent flat section is attached to the tent through one or more rear tent bolts inserted through one or more rear tent bolts holes, wherein, each rear rack flat section is attached to the rack through one or more rear rack bolts inserted through one or more rear rack bolts holes.

* * * * *